(12) United States Patent
Yanagiwara

(10) Patent No.: US 10,721,372 B2
(45) Date of Patent: Jul. 21, 2020

(54) IMAGE READING APPARATUS AND IMAGE SENSOR

(71) Applicant: CANON KABUSHIKI KAISHA, Tokyo (JP)

(72) Inventor: Yuichi Yanagiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/145,771

(22) Filed: Sep. 28, 2018

(65) Prior Publication Data

US 2019/0116286 A1    Apr. 18, 2019

(30) Foreign Application Priority Data

Oct. 16, 2017  (JP) .................................. 2017-200371

(51) Int. Cl.
*H04N 1/053* (2006.01)
*H04N 1/028* (2006.01)
*H04N 1/00* (2006.01)

(52) U.S. Cl.
CPC ......... *H04N 1/053* (2013.01); *H04N 1/00559* (2013.01); *H04N 1/02885* (2013.01); *H04N 2201/0094* (2013.01)

(58) Field of Classification Search
CPC .. H04N 1/053; H04N 1/00933; H04N 3/1518; H04N 5/372

USPC ........ 358/1.9, 1.12, 501, 505, 410, 486, 496; 399/76, 78

See application file for complete search history.

(56) References Cited

U.S. PATENT DOCUMENTS

| 8,130,421 B2 | 3/2012 | Kikuchi | ........................ 358/461 |
| 2007/0146813 A1* | 6/2007 | Sakamoto | .............. H04N 1/484 |
| | | | 358/461 |

FOREIGN PATENT DOCUMENTS

JP    2009-089248    4/2009

* cited by examiner

*Primary Examiner* — Jamares Q Washington
(74) *Attorney, Agent, or Firm* — Venable LLP

(57) ABSTRACT

An image reading apparatus that controls relative positions of a carriage and a document in a first direction using a motor, so as to read an image of the document on a line by line basis, the carriage being mounted with an image sensor and a light source. The image reading apparatus detects an amount of movement caused by the motor in the first direction and generates a first trigger signal in response to input of a synchronization signal generated in accordance with the detected amount of movement, the first trigger signal instructing to start accumulation of charge in the image sensor, and, after a predetermined amount of time since the synchronization signal used for generating the first trigger signal is input, generates a second trigger signal, the second trigger signal instructing to end accumulation of the charge being accumulated in the image sensor.

19 Claims, 6 Drawing Sheets

IMAGE READING APPARATUS AND IMAGE SENSOR

BACKGROUND OF THE INVENTION

Field of the Invention

The present invention relates to a technique for reading an image of a document.

Description of the Related Art

In recent years, a DC (Direct Current) motor has been adopted in a multifunction peripheral (MFP) as a driving source of an image sensor for reading an image of a document. This is because, compared to conventional stepping motors, a DC motor is superior in terms of quietness in a case of conveying an image sensor in a flat bed scanner and in a case of conveying a document in a sheet feed scanner.

On the other hand, since rotational speed of a DC motor may fluctuate due to cogging torque or the like, there is a case where accumulation time of signals in an image sensor fluctuates. Generally, in a case where accumulation time of signals fluctuates, black level data (i.e., data of dark components) changes due to dark currents of the image sensor. In addition, in a case where the lighting width of a sensor light source changes under the influence of fluctuation in accumulation time of signals, white level data changes as well.

In order to cope with such changes in black level data and white level data, correction of read data is carried out by means of image processing. For example, in the technique described in Japanese Patent Laid-Open No. 2009-89248 (hereinafter referred to as Patent Document 1), amounts of fluctuation in black level data and white level data relative to an amount of fluctuation in accumulation time are calculated for each pixel by linear function calculation, so as to use the calculated amounts of fluctuation as correction values to correct shading target data.

SUMMARY OF THE INVENTION

In the technique described in Patent Document 1, an amount of data stored in a memory is increased because, in addition to shading target data, correction values are required for each pixel due to fluctuation in accumulation time. Furthermore, since correction is performed for each pixel, an amount of calculation increases or decreases in proportion to the reading resolution. In addition, since the relation between accumulation time and an amount of dark currents is not perfectly linear, errors in correction may occur in a case of reading a document with high resolution where fluctuation in accumulation time is large.

An image reading apparatus according to an aspect of the present invention is an image reading apparatus that controls relative positions of a carriage and a document in a first direction using a motor, so as to read an image of the document on a line by line basis, the carriage being mounted with an image sensor and a light source. The image reading apparatus includes: a detecting unit configured to detect an amount of movement caused by the motor in the first direction; a generating unit configured to generate a first trigger signal in response to input of a synchronization signal generated in accordance with the detected amount of movement, the first trigger signal instructing to start accumulation of charge in the image sensor, and, after a predetermined amount of time since the synchronization signal used for generating the first trigger signal is input, generate a second trigger signal, the second trigger signal instructing to end accumulation of the charge being accumulated in the image sensor; and an outputting unit configured to sequentially output to the image sensor the first trigger signal and the second trigger signal generated by the generating unit.

Further features of the present invention will become apparent from the following description of exemplary embodiments with reference to the attached drawings.

DESCRIPTION OF THE EMBODIMENTS

Hereinafter, embodiments of the present invention are explained with reference to drawings. Note that the relative arrangement of each component of the apparatus used in the embodiments as well as the shape of the apparatus, etc., are merely examples, and the present invention is not limited thereto.

First Embodiment

<Overall Configuration of MFP>

Figure 1:
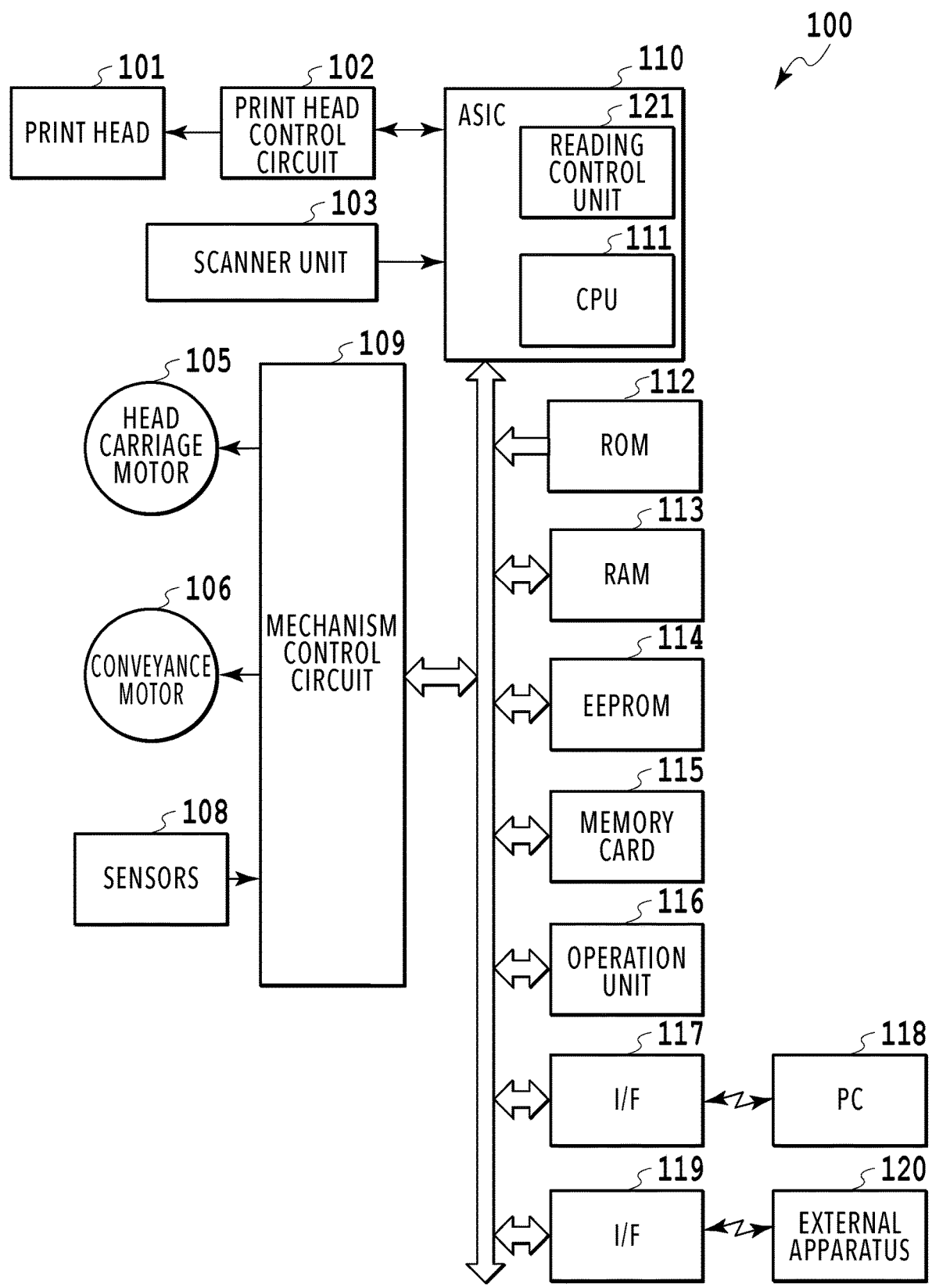
FIG. 1 is a schematic configuration diagram of an MFP.

FIG. 1 is a schematic configuration diagram of an MFP 100, which is an example of an image reading apparatus according to the present embodiment. Note that, in FIG. 1, an MFP having a reading function and a printing function is taken as an example for the sake of explanation, but the image reading apparatus is not limited thereto. There may be an image reading apparatus having an image reading function only or an MFP further having a facsimile function, etc.

As illustrated in FIG. 1, the MFP 100 includes a mechanism control circuit 109, an ASIC (Application Specific Integrated Circuit) 110, and a ROM (Read Only Memory) 112. Furthermore, the MFP 100 includes a RAM (Random Access Memory) 113 and an EEPROM (Electrically Erasable Programmable Read-Only Memory) 114. Furthermore, the MFP 100 includes a memory card 115, an operation unit 116, an I/F (InterFace) 117, and an I/F 119. These are mutually connected via a system bus.

Furthermore, the MFP 100 includes a print head control circuit 102 and a scanner unit 103, which are connected to the ASIC 110. Furthermore, the MFP 100 includes a print head 101, which is connected to the print head control circuit 102. Furthermore, the MFP 100 includes a head carriage motor 105, a conveyance motor 106, and sensors 108, which are connected to the mechanism control circuit 109.

The ASIC 110 includes a CPU (Central Processing Unit) 111 and a reading control unit 121 and generally controls operation of each unit of the MFP 100. The CPU 111 is a central arithmetic processing unit in a form of a microprocessor (i.e., a microcomputer), which controls overall operation of the MFP 100 by executing a program and activating hardware. The reading control unit 121 controls driving of an image sensor such as a CIS (Contact Image Sensor) module and an AFE (Analog Front End) described later.

Furthermore, the reading control unit 121 controls accumulation time of signals (i.e., charges) in the image sensor. Details are described later.

The ROM 112 stores a program corresponding to a processing procedure executed by the ASIC 110. The RAM 113 is used as a work area of the CPU 111 and temporarily stores a parameter for the ASIC 110 to execute a processing procedure and image data, etc. The EEPROM 114 saves a state of the print head 101 even though the MFP 100 is powered off. The memory card 115 stores image data captured by a digital camera or the like.

The operation unit 116 is provided for a user to perform various operations and includes, for example, a hard key and a display unit for presenting (i.e., notifying) a user with various types of information. The display unit may be configured with a touch panel, for example. Furthermore, a sound generator or the like may be included, so that it is possible to present a user with various types of information by outputting audio (i.e., a buzzer, a sound, etc.) based on audio information.

Furthermore, the I/F 117 and the I/F 119 are interfaces with external apparatuses. For example, a PC (Personal Computer) 118 is connected via the I/F 117. Furthermore, for example, an external apparatus 120 such as a digital camera or an optical disk is connected via the I/F 119. Via the I/F 117 and the I/F 119, it is possible to input and output image data between the MFP 100 and an external apparatus.

The print head control circuit 102 electrically controls the print head 101 and generates a driving pulse for causing the print head 101 to eject ink based on image data. The scanner unit 103 is a reading unit that reads an image. The configuration of the scanner unit 103 is described later in detail.

The mechanism control circuit 109 is a circuit that controls and manages various kinds of motors and sensors. The head carriage motor 105 is a motor that moves a head carriage. The head carriage is mounted with the print head 101 and ink tanks of each color. Further, the head carriage ejects ink droplets onto a print sheet while moving in a direction perpendicular to the conveyance direction of the print sheet along a shaft supporting the head carriage, so as to perform printing. Note that, in the present embodiment, although a print unit that conveys a head carriage in a direction intersecting with the conveyance direction is taken as an example for the sake of explanation, the print unit is not limited thereto. For example, the print unit may be provided with a line head including nozzle arrays of each color along the conveyance direction. The conveyance motor 106 is a motor for conveying a print medium. The sensors 108 are sensors for monitoring an operation state of a print unit or a scanner unit.

<Explanation of Scanner Unit>

Figure 2:
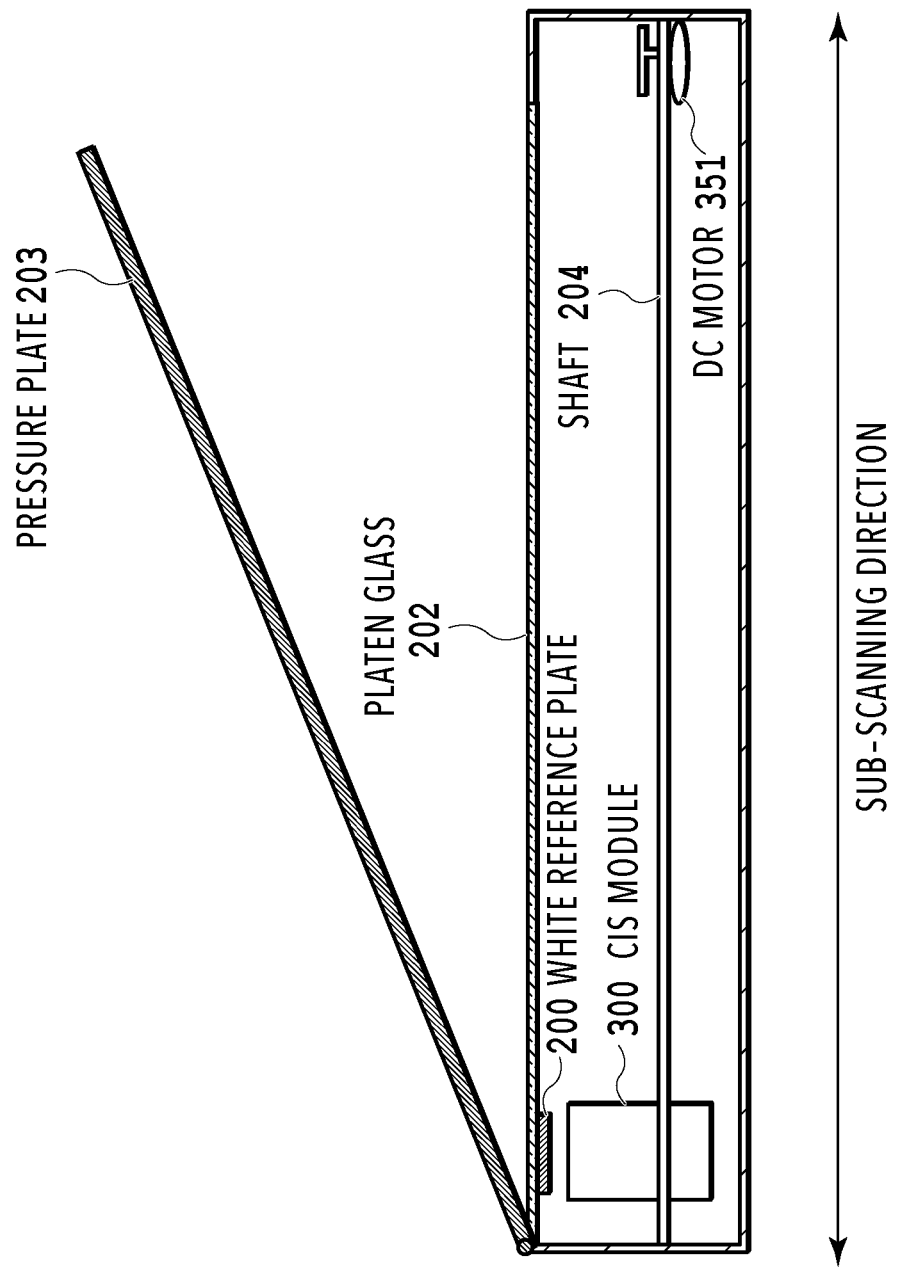
FIG. 2 is a configuration diagram of a scanner unit.

FIG. 2 is a diagram for explaining a configuration of the scanner unit 103. The CIS module 300 is a module mounted with a contact image sensor and an LED (Light Emitting Diode) light source for illuminating a document. The white reference plate 200 is a white reference plate used for shading correction, light adjustment processing, or the like. The DC motor 351 is a motor serving as a driving source of the CIS module 300. The shaft 204 is a shaft for moving the CIS module 300. The pressure plate 203 is a pressure plate for blocking light other than a LED light source in a case of reading image data of a document placed on the platen glass 202. The white reference plate 200 is adhered to the platen glass 202. The CIS module 300 and the DC motor 351 are connected to a circuit board (not illustrated), on which the ASIC 110, the ROM 112, the RAM 113, etc., are mounted, by a cable (not illustrated) such as a flat cable. The CIS module 300 is driven by the DC motor 351 and controlled to move in a first direction (i.e., sub-scanning direction) along the shaft 204. Furthermore, the CIS module 300 is disposed so as to extend in a second direction (i.e., main scanning direction) intersecting with the first direction. The CIS module 300 moves in the first direction (i.e., sub-scanning direction) while reading an area from one end to the other end of the document reading area in the second direction (i.e., main scanning direction). In the above way, the CIS module 300 reads an image of a document in the document reading area on a line by line basis in the first direction.

<Explanation of Configuration of Image Reading Apparatus>

Figure 3:
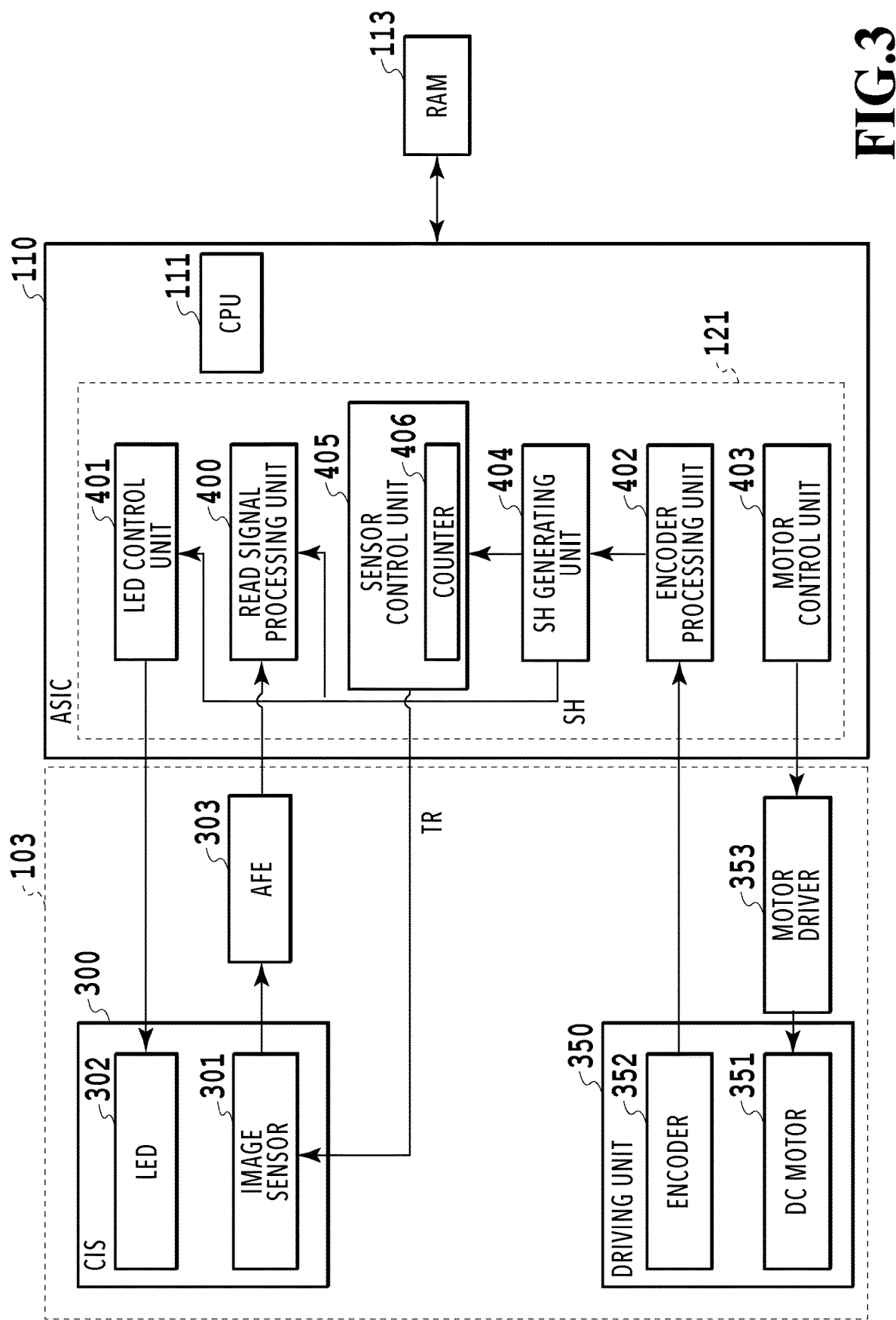
FIG. 3 is an electrical configuration diagram of an image reading apparatus.

FIG. 3 is a diagram for explaining an electrical configuration pertaining to a configuration in which the MFP 100 functions as an image reading apparatus. The scanner unit 103 includes a CIS module 300, an AFE 303, a driving unit 350, and a motor driver 353. The reading control unit 121 of the ASIC 110 includes a read signal processing unit 400, an LED control unit 401, an encoder processing unit 402, a motor control unit 403, a horizontal synchronizing signal (SH) generating unit 404, and a sensor control unit 405. The sensor control unit 405 includes a counter 406.

The CIS module 300 has a configuration including an image sensor 301 in which multiple light receiving pixels are arranged in line and an LED 302 as a light source for irradiating a document with light. The LED 302 is configured to include an R color (i.e., Red) LED, a G color (i.e., Green) LED, and a B color (i.e., Blue) LED, corresponding to the three primary colors of light. In an operation of reading a document, the CIS module 300 irradiates the document with the LED 302. In the image sensor 301, multiple light receiving pixels including photodiodes (i.e., light receiving elements) are arranged in line. The image sensor 301 accumulates charges obtained by photoelectric conversion of light reflected from a document surface by use of photodiodes for a predetermined amount of time and performs voltage conversion, so as to output image signals. In the present embodiment, the image sensor 301 controls accumulation time, based on a control signal (also referred to as a trigger signal) instructing to start accumulation and a control signal instructing to end accumulation, which are input by the reading control unit 121. Details are described later.

An image signal output from the CIS module 300 is input to the AFE (Analog Front End) 303. The AFE 303 samples an input image signal and performs analog-to-digital conversion (A/D conversion) after gain and offset adjustment, etc., so as to provide an output to the read signal processing unit 400 of the ASIC 110. The read signal processing unit 400 performs image processing such as packing of an input image signal, shading correction and color correction of an image signal, and the like.

The driving unit 350 has a configuration including a DC motor 351, an encoder 352, etc. The DC motor 351 is a driving source that causes the CIS module 300 to scan a document reading area in the first direction (i.e., sub-scanning direction). The encoder 352 is, for example, an optical rotary encoder. In a case where the DC motor 351 rotates a predetermined number of times (that is, in a case where the CIS module 300 is caused to scan a predetermined distance in the sub-scanning direction), an encoder pulse is output from the encoder 352. An encoder pulse is output in accordance with the number of rotations of the DC motor 351 and the purpose of the encoder pulse is detecting an amount of driving of the DC motor 351, that is, an amount of movement of the CIS module 300. An encoder pulse is input to the encoder processing unit 402. The encoder processing unit 402 counts encoder pulses and generates a line start pulse in a case of reaching a count number corresponding to one line. An interval between line start pulses as described above corresponds to a reading time of one line (i.e., line time). Furthermore, the CPU 111 performs feedback control for the motor control unit 403 to achieve scanning at a target speed, using position information (i.e., the number of counted encoder pulses) and speed information (i.e., pulse interval) calculated by the encoder processing unit 402. The motor control unit 403 performs PWM (Pulse Width Modulation) control on a current supplied from the motor driver 353 to the DC motor 351.

<Explanation of Timing Chart>

Figure 4:
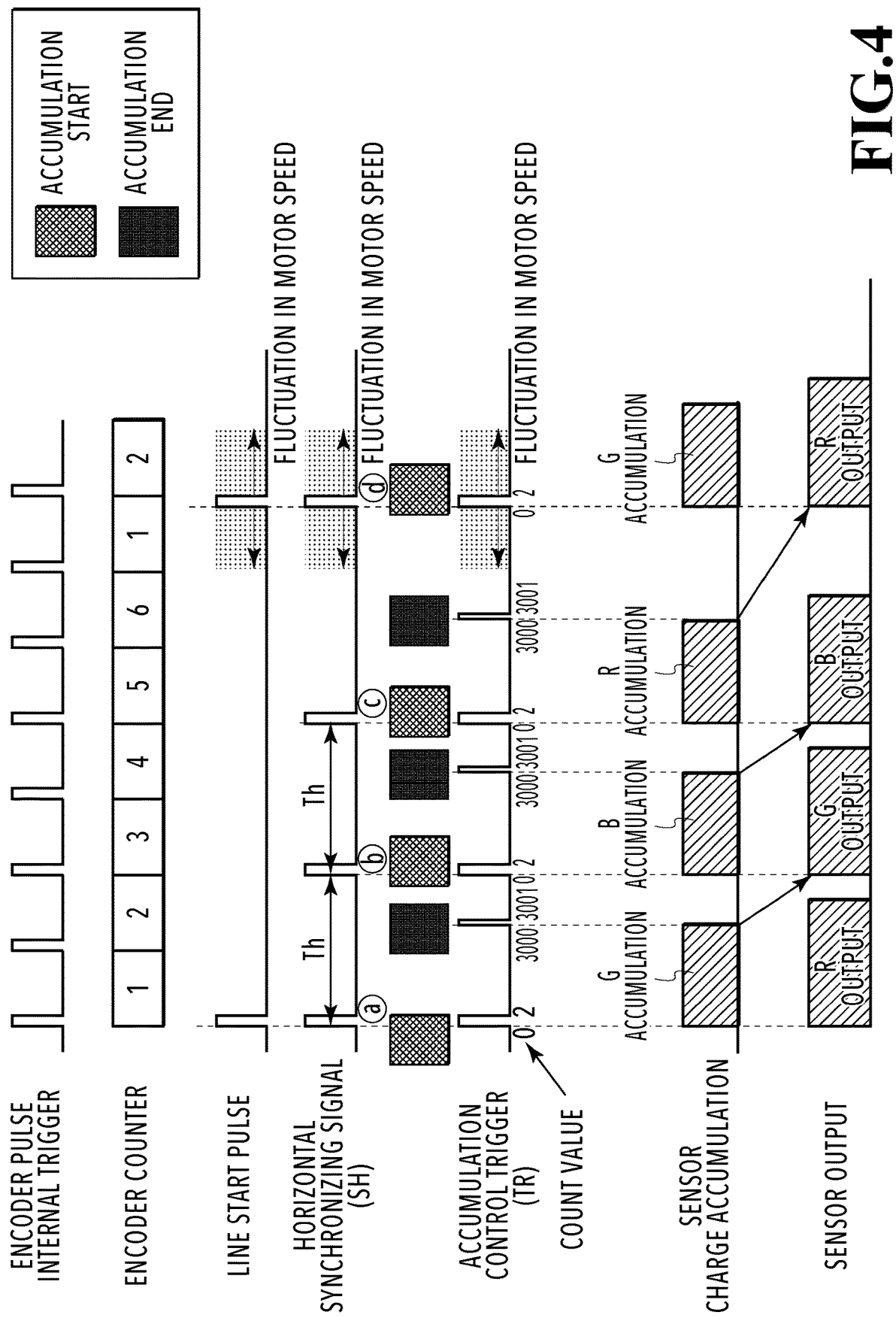
FIG. 4 is a timing chart of control of accumulation time.

FIG. 4 is a diagram illustrating a timing chart for explaining accumulation control directed to the image sensor 301 in the present embodiment and operation timing of the image sensor 301. The below is explained with reference to FIG. 3 and FIG. 4. An encoder pulse is generated by the encoder 352 of the driving unit 350 and is input to the encoder processing unit 402. The encoder processing unit 402 includes a counter (i.e., encoder counter) that counts up at either a rising edge or a falling edge, or both edges of an encoder pulse. The encoder processing unit 402 outputs a line start pulse in a case where the number of counted encoder pulses reaches a number corresponding to one line, which is set in advance by use of a register, etc. In FIG. 4, an example in which a line start pulse is output upon six counts of rising edges. A line start pulse is input from the encoder processing unit 402 to the SH generating unit 404. An encoder pulse and a line start pulse are used for detecting an amount of movement of the CIS module 300 controlled by a DC motor to move.

Here, speed of the DC motor 351 may fluctuate due to cogging or the like. Fluctuation in speed of the DC motor 351 causes a line start pulse not to be output at a regular interval. The present embodiment makes it possible to properly perform accumulation control directed to the image sensor 301 in a case where there is such a line start pulse which is not output at a regular interval.

A line start pulse input to the SH generating unit 404 is multiplied by the SH generating unit 404 into a predetermined number of horizontal synchronizing signals (SH). In FIG. 4, an example being multiplied by three is illustrated. In the present embodiment, a monochrome line sensor is used for the image sensor 301. Therefore, in a case of color reading, multiplication by three is performed because charge accumulation of the image sensor 301 is performed by turning on the LEDs 302 in a line sequential manner from G color (Green) to B color (Blue) to R color (Red). Note that the multiplication factor is not limited thereto. It is possible to set the multiplication factor using a register, etc.

First, the SH generating unit 404 generates a horizontal synchronizing signal (SH) (corresponding to the signal of Part "a" in FIG. 4) at the timing of input of a line start pulse. Next, after an elapse of the cycle (i.e., reading cycle) (Th) of the horizontal synchronizing signal (SH), the SH generating unit 404 generates a horizontal synchronizing signal (SH) (corresponding to the signal of Part "b" in FIG. 4). Next, after an elapse of the cycle (Th) of the horizontal synchronizing signal (SH), the SH generating unit 404 generates a horizontal synchronizing signal (SH) (corresponding to the signal of Part "c" in FIG. 4). Furthermore, at the timing of input of the next line start pulse, the SH generating unit 404 generates a horizontal synchronizing signal (SH) (corresponding to the signal of Part "d" in FIG. 4). Note that the cycle (Th) of a horizontal synchronizing signal (SH) may be set by use of a register, etc., and is set to be such a cycle that at least ensures time required by the image sensor 301 for charge accumulation and outputting. As described later, the horizontal synchronizing signals (SH) are reading synchronization signals used for reading control. A generated horizontal synchronizing signal (SH) is input to the read signal processing unit 400, the LED control unit 401, and the sensor control unit 405.

Hereinafter, the period from the point where the horizontal synchronizing signal of Part "a" in FIG. 4 is generated to the point where the horizontal synchronizing signal of Part "b" is generated is referred to as a-b section. Similarly, the period from the point where the horizontal synchronizing signal of Part "b" in FIG. 4 is generated to the point where the horizontal synchronizing signal of Part "c" is generated is referred to as b-c section. Furthermore, the period from the point where the horizontal synchronizing signal of Part "c" in FIG. 4 is generated to the point where the horizontal synchronizing signal of Part "d" is generated is referred to as c-d section.

The a-b section of FIG. 4 is an accumulation section of G color as well as an output section of R color accumulated in the previous cycle (i.e., the previous line not illustrated in FIG. 4). In the a-b section of FIG. 4, the LED control unit 401 lights the G color LED 302 for a certain amount of time in synchronization with the horizontal synchronizing signal (SH) output from the SH generating unit 404. The b-c section of FIG. 4 is an accumulation section of B color as well as an output section of G color accumulated in the previous cycle (i.e., the cycle corresponding to the a-b section of FIG. 4). In the b-c section of FIG. 4, the LED control unit 401 lights the B color LED 302 for a certain amount of time in synchronization with the horizontal synchronizing signal (SH). The c-d section of FIG. 4 is an accumulation section of R color as well as an output section of B color accumulated in the previous cycle (i.e., the cycle corresponding to the b-c section of FIG. 4). In the c-d section of FIG. 4, the LED control unit 401 lights the R color LED 302 for a certain amount of time in synchronization with the horizontal synchronizing signal (SH). The lighting time of each color of LED 302 is determined by light adjustment control. Since light adjustment control is common control, explanation is omitted.

The read signal processing unit 400 performs various kinds of image processing on a line by line basis in accordance with input of a horizontal synchronizing signal (SH).

The sensor control unit 405 includes a counter 406. In response to input of a horizontal synchronizing signal (SH), the sensor control unit 405 resets the counter 406 and causes the counter 406 to start counting up in synchronization with an internal clock (not illustrated). In a case where the counter 406 reaches a count value designated by a register, etc., the sensor control unit 405 generates a trigger signal serving as an accumulation control trigger (TR) of the image sensor 301. For example, as illustrated in FIG. 4, the sensor control unit 405 generates an accumulation start pulse and an accumulation end pulse. Each of an accumulation start pulse and an accumulation end pulse is generated in one cycle (Th) of a horizontal synchronizing signal (SH). A generated accumulation control trigger signal is output to the image sensor 301.

The following is explanation of an accumulation control trigger (TR) signal of FIG. 4. In a case where a horizontal synchronizing signal is input to the sensor control unit 405, the sensor control unit 405 resets the counter 406. For example, the count value of the counter 406 becomes 0. In a case where the count value becomes 0, the sensor control unit 405 drives the accumulation control trigger (TR) of the image sensor 301 to Hi. Then, in a case where the count value is counted up to 2, the sensor control unit 405 drives the accumulation control trigger (TR) of the image sensor 301 to Lo. With such control as above, the sensor control unit 405 generates an accumulation start pulse (i.e., first trigger signal). In synchronization with an accumulation start pulse, the image sensor 301 resets charges of light receiving pixels from the previous cycle and starts charge accumulation of light receiving pixels. Furthermore, in synchronization with the accumulation start pulse, the image sensor 301 outputs to the AFE 303 an image signal stored in a storage memory (not illustrated) of the image sensor 301 in the previous cycle.

Based on the horizontal synchronizing signal (SH) used for generating the accumulation start pulse, the sensor control unit 405 generates an accumulation end pulse after a predetermined amount of time (i.e., after an elapse of a certain amount of time) from the timing of input the horizontal synchronizing signal (SH). It is possible to set the predetermined amount of time using the count value of the counter 406. In the present embodiment, the sensor control unit 405 generates the accumulation end pulse after the count value of the counter 406 reaches 3000. Specifically, the sensor control unit 405 drives the accumulation control trigger (TR) of the image sensor 301 to Hi in a case where the count value is counted up to 3000. Then, in a case where the count value is counted up to 3001, the sensor control unit 405 drives the accumulation control trigger (TR) of the image sensor 301 to Lo. With such control as above, the sensor control unit 405 generates an accumulation end pulse (i.e., second trigger signal). The image sensor 301 performs voltage conversion on accumulated charges and transfers the converted charges to a storage memory (not illustrated) of the image sensor 301 in synchronization with an accumulation end pulse. Note that an accumulation end pulse is generated at such timing that assures enough accumulation time of charges for the image sensor 301 and that does not collide with input of a horizontal synchronizing signal (SH). The operation of the accumulation control trigger (TR) and the image sensor 301 are the same in the a-b section, the b-c section, and the c-d section of horizontal synchronizing signals (SH). Note that, even though charges are accumulated in light receiving pixels of the image sensor 301 after an accumulation end pulse, the accumulated charges are reset in synchronization with the accumulation start pulse of the next cycle.

Conventionally, particularly in the c-d section, since input of the horizontal synchronizing signal (SH) in the next cycle (corresponding to "d" in FIG. 4) is synchronized with a signal output from the encoder 352, there has been a case in which accumulation time is not constant due to fluctuation in speed of the motor. As a result, there has been a case in which fluctuation occurs in output of image signals, each of which is output from the image sensor 301 for a reading line. According to the present embodiment, it is possible to fix an interval between an accumulation start pulse and an accumulation end pulse for each reading line. That is, it is possible to fix accumulation time of the image sensor 301. Therefore, it is possible to reduce fluctuation in dark components for each reading line and achieve improvement of image quality.

In the above way, an accumulation start pulse (i.e., first trigger signal) is generated in a case where the count value of the counter 406 becomes 0 in synchronization with a horizontal synchronizing signal. In other words, an accumulation start pulse (i.e., first trigger signal) is generated in synchronization with a horizontal synchronizing signal. That is, in the present embodiment, although accumulation by the image sensor 301 is started in synchronization with a horizontal synchronizing signal, control to end the accumulation is performed by the image sensor 301 in accordance with an accumulation end pulse. Therefore, even in a case where fluctuation occurs in speed of the DC motor 351, a period during which charge is accumulated by the image sensor 301 is controlled to be constant. Therefore, it is possible to reduce fluctuation in dark components due to dark currents.

Note that, as illustrated in FIG. 4, a period between an accumulation start pulse and an accumulation end pulse corresponding to each cycle (Th) in FIG. 4 is shorter than a period between a horizontal synchronizing signal corresponding to the starting point of a first reading cycle and a horizontal synchronizing signal corresponding to the starting point of a second reading cycle, which follows the first reading cycle. Therefore, even in a case where periodic fluctuation of line start pulses and horizontal synchronizing signals occur due to fluctuation in motor speed, it is possible to ensure enough accumulation time of charges for the image sensor 301. Thus, it is possible to control the accumulation period of charges to be constant. Furthermore, in the present embodiment, the signal line (i.e., output line) through which the accumulation control trigger (TR) signal is output from the sensor control unit 405 to the image sensor 301 is one signal line. In addition, by making pulse widths of an accumulation start pulse and an accumulation end pulse different from each other, it is possible for the image sensor 301 to distinguish an accumulation start pulse and an accumulation end pulse from each other. That is, in the present embodiment, an accumulation start pulse (i.e., first trigger signal) having a first pulse width and an accumulation end pulse (i.e., second trigger signal) having a second pulse width, which is different from the first pulse width, are sequentially output through the signal line from which the accumulation control trigger (TR) signal is output. As illustrated in FIG. 4, an accumulation start pulse and an accumulation end pulse are alternately output. An accumulation start pulse and an accumulation end pulse output sequentially from the sensor control unit 405 are sequentially input to the image sensor 301 through the signal line. According to such a configuration as above, it is possible to control a period during which charge is accumulated by the image sensor 301 to be constant without adding a new signal line for control.

<Explanation of Flowchart>

Figure 5:
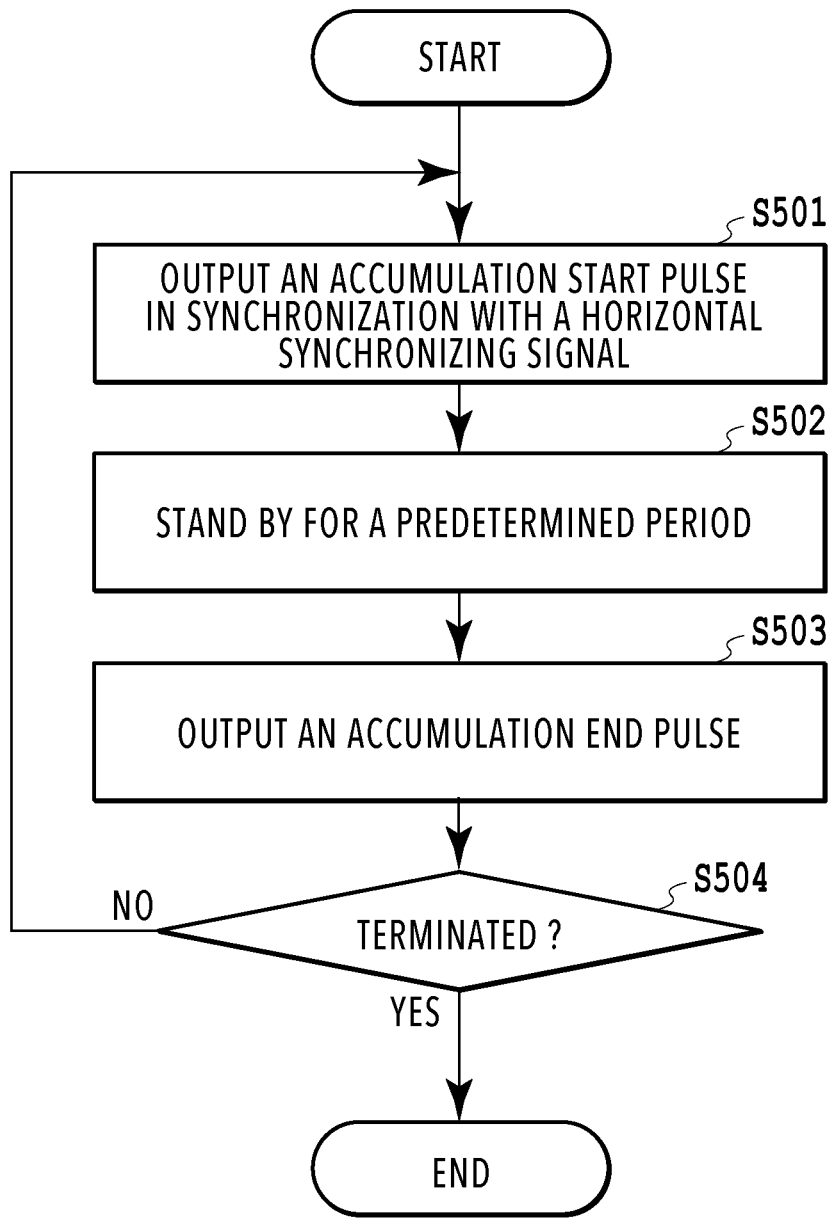
FIG. 5 is a flowchart of a sensor control unit.

FIG. 5 is a flowchart for explaining the flow of processing by the sensor control unit 405 in the present embodiment. In Step S501, the sensor control unit 405 inputs a horizontal synchronizing signal (SH) generated by the SH generating unit 404. Then, in synchronization with the horizontal synchronizing signal (SH), the sensor control unit 405 generates an accumulation start pulse and outputs the accumulation start pulse to the image sensor 301. Specifically, in response to input of the horizontal synchronizing signal (SH), the sensor control unit 405 resets the counter 406. Then, a pulse corresponding to the value of the counter 406 is output to the image sensor 301. In Step S502, the sensor control unit 405 stands by for a predetermined period. That is, the sensor control unit 405 stands by until the value of the counter 406 reaches a predetermined value. In Step S503, in a case where the value of the counter 406 reaches the predetermined value, the sensor control unit 405 generates an accumulation end pulse and outputs the accumulation end pulse to the image sensor 301. The above processing is repeated until the processing is terminated (YES in S504).

Figure 6:
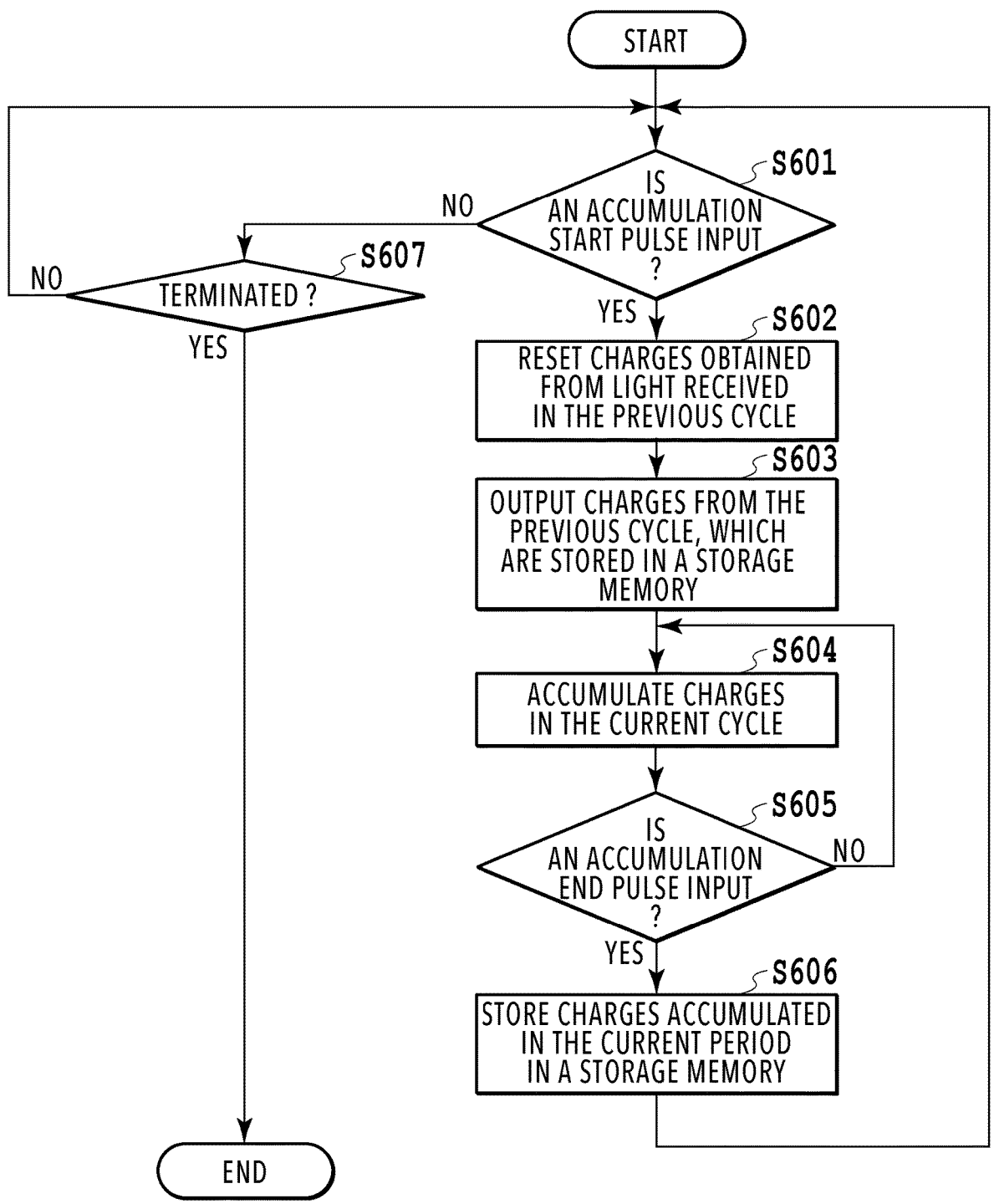
FIG. 6 is a flowchart of an image sensor.

FIG. 6 is a flowchart for explaining the flow of processing by the image sensor 301 in the present embodiment. In Step S601, the image sensor 301 stands by until an accumulation start pulse is input. In a case where an accumulation start pulse is not input (NO in S601), the processing is terminated in response to an instruction to terminate the processing (YES in S607).

Upon detecting input of an accumulation start pulse, the image sensor 301 proceeds to Step S602. In step S602, the image sensor 301 resets charges obtained from light received in the previous cycle. Then, in Step S603, the image sensor 301 outputs to the AFE 303 charges (i.e., image signal) from the previous cycle, which are stored in a storage memory. Then, in Step S604, the image sensor 301 starts accumulation of charge in the current cycle. The accumulation of charge in the current cycle lasts until an accumulation end pulse is input.

In Step S605, upon detecting input of an accumulation end pulse (YES in Step S605), the image sensor 301 proceeds to Step S606. In Step S606, the image sensor 301 stores charges accumulated in the current cycle in a storage memory. Then, turning back to Step S601, the processing is repeated.

As explained above, according to the present embodiment, even in a case of using a DC motor whose rotation speed may fluctuate, it is possible to maintain constant accumulation time of signals in an image sensor. In other words, it is possible to reduce fluctuation in accumulation time of signals in an image sensor. Therefore, it is possible to reduce fluctuation in dark components (i.e., dark currents) for each reading line. Furthermore, according to the present embodiment, since data output from the sensor is data in which fluctuation in dark components is reduced, there is no need for retaining, in read signal processing unit 400 posterior to the image sensor, correction data for performing shading correction in accordance with fluctuation in accumulation time. Furthermore, according to the present embodiment, the accumulation control trigger signal is output to the image sensor 301 through one signal output line. Therefore, it is possible to reduce fluctuation in accumulation time of signals in an image sensor, which is caused by fluctuation in rotational speed of a motor, without increasing the number of control signals of the image sensor.

Second Embodiment

In the first embodiment described above, a mode in which the CIS module 300 is driven by the DC motor 351 to read a document while moving in the first direction is taken as an example for the sake of explanation. However, the present invention is not limited to the mode. Any image reading device may be possible as far as the image reading device controls, by use of a motor, relative positions in the first direction of a document and a carriage, which is mounted with an image sensor and a light source, so as to read an image of the document on a line by line basis. For example, the present invention may be applied to a mode in which a document is read by use of an automatic document feeder (ADF). In a case of an ADF, the CIS module 300 is fixed to a predetermined position, and a document conveyed in the first direction by a conveyance mechanism, which is provided with a DC motor as a driving source, is scanned by the CIS module 300.

The configuration of the present embodiment is the same as the configuration explained in the first embodiment. For example, the driving unit 350 of FIG. 3 may be used as a driving unit for the ADF. Alternatively, a driving unit equivalent to the driving unit 350 of FIG. 3 may be additionally provided. For example, in a case where the driving unit 350 of FIG. 3 serves as a first driving unit, the image reading apparatus may further include a second driving unit for the ADF in addition to the first driving unit. Then, depending on the reading mode to be used, it is possible to switch between the first driving unit and the second driving unit by means of a selector (not illustrated) in order to input signals to the encoder processing unit 402. As described above, even in a case of using an ADF, it is possible to reduce fluctuation in accumulation time of signals in an image sensor by performing the same processing as in the first embodiment.

Other Embodiments

Although, in the embodiments explained above, a case of reading an image of a document in full color (i.e., RGB) is taken as an example for the sake of explanation, the present invention is not limited thereto. Even in a case of reading an image in monochrome or in a case of reading an image in multiple colors, the same modes may be adopted. Even in the above cases, it is possible to obtain the same effect as in the embodiments described above.

Furthermore, although, in the embodiments explained above, a configuration in which data for one line of one color is stored in the storage memory of the image sensor is taken as an example, the present invention is not limited thereto. A configured in which data for multiple colors is stored is possible as well.

Furthermore, although, in the embodiments explained above, a DC motor is taken as an example of a motor whose rotational speed fluctuates for the sake of explanation, the present invention is not limited thereto. In any case of using a motor whose rotational speed can fluctuate, it is possible to obtain the same effect as in the embodiments described above.

Furthermore, although, in the embodiments explained above, a mode including one sensor control unit 405 and one counter 406 is taken as an example for the sake of explanation, the present invention is not limited thereto. It is possible that a sensor control unit for generating an accumulation start pulse and a sensor control unit for generating an accumulation end pulse are included individually. Furthermore, it is possible that a counter is included in each control unit. Furthermore, an external clock may be used as the clock for counting up a count value. Furthermore, there may be a configuration including a signal line for outputting an accumulation start pulse output from a sensor control unit and a signal line for outputting an accumulation end pulse output from a sensor control unit, individually.

According to the present disclosure, even in a case of using a motor whose rotation speed may fluctuate, it is possible to reduce fluctuation in accumulation time of signals in an image sensor.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-200371, filed Oct. 16, 2017, which is hereby incorporated by reference wherein in its entirety.

What is claimed is:

1. An image reading apparatus that controls relative position in a first direction using a motor between a document and a carriage mounted with an image sensor, the image reading apparatus comprising:
   at least one processor causing the image reading apparatus to act as:
   a detecting unit configured to detect an amount relating to movement in the first direction caused by the motor;
   a first generating unit configured to generate a first trigger signal in response to input of a synchronization signal generated based on the detected amount relating to the movement;
   a counting unit configured to count amount relating to elapsed time since a first synchronization signal used for generating the first trigger signal;
   a second generating unit configured to generate a second trigger signal in response to the counted amount reaching a predetermined amount, wherein the second trigger signal does not depend on a second synchronization signal subsequent to the first synchronization signal; and
   an outputting unit configured to output, to the image sensor, the first trigger signal and the second trigger signal generated by the first generating unit and the second generating unit, respectively,
   wherein accumulation of charge in the image sensor is started in response to the first trigger signal, and the accumulation of the charge in the image sensor is ended in response to the second trigger signal.

2. An image reading apparatus that controls relative position in a first direction using a motor between a document and a carriage mounted with an image sensor, the image reading apparatus comprising:
   at least one processor causing the image reading apparatus to act as
   a detecting unit configured to detect an amount relating to movement in the first direction caused by the motor;
   a counting unit configured to count amount relating to elapsed time since a first synchronization signal; and
   an output line configured to output a trigger signal based on the first synchronization signal generated based on the detected amount relating to the movement, the first synchronization signal being used for generating a first trigger signal,
   wherein the output line outputs, the first trigger signal having a first pulse width in response to input of the first synchronization signal and outputs the second trigger signal having a second pulse width that is different from the first pulse width, the second trigger signal being generated in response to the counted amount reaching a predetermined amount, wherein the second trigger signal does not depend on a second synchronization signal subsequent to the first synchronization signal, and
   wherein accumulation of charge in the image sensor is started in response to the first trigger signal and the accumulation of the charge in the image sensor is ended in response to the second trigger signal.

3. The image reading apparatus according to claim 1, wherein, in synchronization with the first trigger signal, the image sensor resets accumulated charge, starts accumulation of charge, and outputs an image signal of a previous cycle, the image signal being stored in a storage memory, and
   wherein, in synchronization with the second trigger signal, the image sensor loads into the storage memory an image signal obtained by converting charge accumulated between the first trigger signal and the second trigger signal.

4. The image reading apparatus according to claim 1, wherein the detecting unit detects the amount relating to the movement by counting a first pulse, the first pulse being detected in a case where movement of a predetermined distance is made in the first direction.

5. The image reading apparatus according to claim 4, wherein the first trigger signal is generated in synchronization with the first synchronization signal obtained by multiplying a second pulse, the second pulse being generated each time the first pulse reaches a count number corresponding to one line.

6. The image reading apparatus according to claim 5, wherein a period between the first trigger signal and the second trigger signal in a first reading cycle is shorter than a period between the first synchronization signal corresponding to a starting point of the first reading cycle and the second synchronization signal corresponding to a starting point of a second reading cycle, the first reading cycle being followed by the second reading cycle.

7. The image reading apparatus according to claim 1, wherein an interval between the first trigger signal and the second trigger signal is constant for each line.

8. The image reading apparatus according to claim 1, wherein the motor is a DC motor, and wherein the amount relating to the movement in the first direction is detected based on a signal output from an encoder in association with driving of the motor.

9. The image reading apparatus according to claim 1, wherein the image reading apparatus controls the carriage to move in the first direction using the motor.

10. The image reading apparatus according to claim 1, wherein the image reading apparatus controls the document to move in the first direction using the motor.

11. An image sensor used in an image reading apparatus that controls relative position in a first direction using a motor between a document and a carriage mounted with the image sensor, the image sensor comprising:
  an input line configured to input a first trigger signal and a second trigger signal, the first trigger signal being generated in response to input of a first synchronization signal generated based on a detected amount relating to movement in a first direction caused by the motor, the second trigger signal being generated in response to an elapsed time since the synchronization signal used for generating the first trigger signal reaching a predetermined amount, wherein the second trigger signal does not depend on a second synchronization signal subsequent to the first synchronization signal,
  wherein the image sensor is configured to,
    in synchronization with the first trigger signal, reset accumulated charge, start accumulation of charge, and output an image signal of a previous cycle, the image signal being stored in a storage memory, and
    in synchronization with the second trigger signal, load into the storage memory an image signal obtained by converting charge accumulated between the first trigger signal and the second trigger signal.

12. The image reading apparatus according to claim 2, wherein, in synchronization with the first trigger signal, the image sensor resets accumulated charge, starts accumulation of charge, and outputs an image signal of a previous cycle, the image signal being stored in a storage memory, and
wherein, in synchronization with the second trigger signal, the image sensor loads into the storage memory an image signal obtained by converting charge accumulated between the first trigger signal and the second trigger signal.

13. The image reading apparatus according to claim 2, wherein the detecting unit detects the amount relating to the movement by counting a first pulse, the first pulse being detected in a case where movement of a predetermined distance is made in the first direction.

14. The image reading apparatus according to claim 13, wherein the first trigger signal is generated in synchronization with the first synchronization signal obtained by multiplying a second pulse, the second pulse being generated each time the first pulse reaches a count number corresponding to one line.

15. The image reading apparatus according to claim 14, wherein a period between the first trigger signal and the second trigger signal in a first reading cycle is shorter than a period between the first synchronization signal corresponding to a starting point of the first reading cycle and the second synchronization signal corresponding to a starting point of a second reading cycle, the first reading cycle being followed by the second reading cycle.

16. The image reading apparatus according to claim 2, wherein an interval between the first trigger signal and the second trigger signal is constant for each line.

17. The image reading apparatus according to claim 2, wherein the motor is a DC motor, and wherein the amount of movement in the first direction is detected based on a signal output from an encoder in association with driving of the motor.

18. The image reading apparatus according to claim 2, wherein the image reading apparatus controls the carriage to move in the first direction using the motor.

19. The image reading apparatus according to claim 2, wherein the image reading apparatus controls the document to move in the first direction using the motor.

* * * * *